W. B. RICHARDSON.
VENTILATING CREAM CAN COVER.
APPLICATION FILED MAR. 26, 1917.

1,259,047.

Patented Mar. 12, 1918.

WITNESSES

INVENTOR
Walter B. Richardson
BY
ATTORNEY

UNITED STATES PATENT OFFICE.

WALTER B. RICHARDSON, OF FALLON, NEVADA.

VENTILATING CREAM-CAN COVER.

1,259,047.  Specification of Letters Patent.  Patented Mar. 12, 1918.

Application filed March 26, 1917. Serial No. 157,545.

*To all whom it may concern:*

Be it known that I, WALTER B. RICHARDSON, a citizen of the United States, residing at Fallon, in the county of Churchill and State of Nevada, have invented certain new and useful Improvements in Ventilating Cream-Can Covers, of which the following is a specification.

My invention relates to milk or cream cans and the principal object of the invention is to provide means for ventilating or cooling the contents of the can while preventing insects, dirt or other foreign bodies from getting into the can or contaminating the contents thereof.

Another object of the invention is to provide means for setting up a draft in the can and for directing the air currents onto the milk or cream.

Another object of the invention is to make it applicable to cans as now made, so it can be embodied thereon without much change in said cans.

Another object of my invention is to provide a device of this character which is simple and durable in construction, reliable and efficient in operation and one which can be manufactured and placed upon the market at a minimum cost.

To accomplish the above and various other objects, my invention consists essentially of a can having wire-covered openings therein, located at different levels, and of a partition separating the openings and directing the air currents downwardly onto the milk.

The invention also consists in certain other features of construction and in the combination and arrangement of the several parts, to be hereinafter fully described and specifically pointed out in the appended claims.

In describing my invention in detail, reference will be had to the accompanying drawings, wherein like characters denote like or corresponding parts throughout the several views, and in which.

Figure 1:
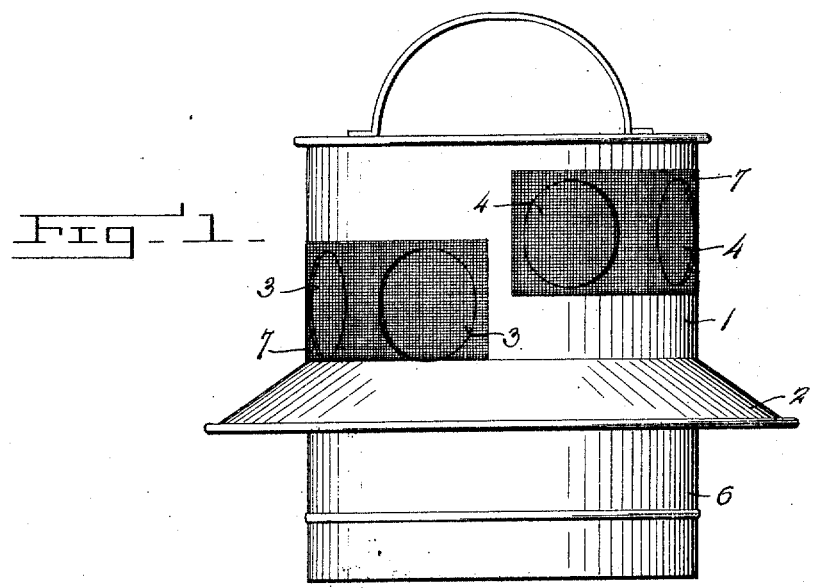
Figure 1 is an elevation, showing how one series of holes lies in relation to the other.
Figure 2:
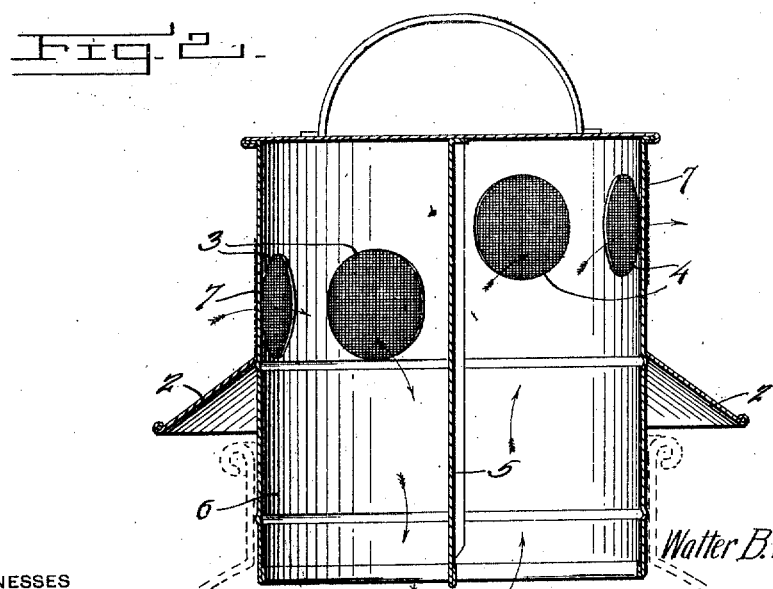
Fig. 2 is a sectional view.

In these drawings, 1 indicates the can top or cover, provided with the rim 2, and above this rim is provided a series of openings 3 extending approximately half way around the cover. 4 indicates another series of openings extending approximately half way around the other side of the can, such openings being located above the plane of the first series of openings. 7 indicates gauze covering the openings.

In the interior of the can cover I locate a partition 5 dividing the cover in halves and said partition is so placed as to lie between the two series of openings. Said partition is securely fastened to the walls of the cover and the top thereof and projects down into the can far enough to come a short distance above the level of the milk when the can is full.

In the drawings, the cover is provided with an extension 6, extending as far down into the can as does the partition. It will be seen that when the can is filled and the cover placed thereon a draft will be set up, due to the high temperature of the milk, so that the air is caused to circulate through the holes of the lower series down around the partition, where it comes in close contact with the milk, and then up on the other side of the partition and out through the holes of the upper series. Thus, it is not necessary to allow the milk to stand uncovered while being cooled and all danger of anything getting into the milk is avoided.

It is thought from the foregoing that the advantages and novel features of my invention will be readily apparent.

I desire it to be understood that I may make slight changes in the construction and in the combination and arrangement of the several parts, provided such changes fall within the scope of the appended claims.

I claim as my invention:

1. A milk can cover, having openings on opposite sides thereof, one opening being located above the plane of the other, and a partition separating the openings.

2. A milk can cover, having gauze covered openings on opposite sides thereof, the openings on one side being higher than those on the other, and a partition within the can cover separating the lower openings from the higher ones.

3. A milk can cover, having gauze covered openings on opposite sides thereof, the openings on one side being higher than those on the other, a partition in the interior of the can cover separating the lower openings from the higher ones, said partition extending down to a point adjacent the lower end of the cover, and an extension engaging with the lower part of the partition.

In testimony whereof I affix my signature in presence of two witnesses.

WALTER B. RICHARDSON.

Witnesses:
R. C. SCHORUP,
E. M. HANSEN.